Patented Oct. 12, 1937

2,095,897

UNITED STATES PATENT OFFICE 2,095,897

HYDROGENATION OF ARYL NAPHTHYL-AMINES

Charles F. Winans, Akron, Ohio, assignor to Wingfoot Corporation, Wilmington, Del., a corporation of Delaware No Drawing. Application April 23, 1936, Serial No. 76,017

11 Claims. (Cl. 260—128)

This invention relates to a method of hydrogenating organic materials. More particularly it relates to the hydrogenation of aryl naphthylamines.

Methods of hydrogenating these compounds such as, for example, that disclosed in British Patent 276,571 issued on September 1, 1927, are already known.

However, by the present invention, a definite advance in the art in the form of an improved method has been made. In the usual procedure the aryl naphthylamine is dissolved in a suitable solvent and hydrogenated in the presence of a catalyst. This method involves as items of expense, the cost of the solvent, increased overhead due to reduction of the productive capacity of the reaction vessel, such as an autoclave, by the amount of space occupied by the solvent, and heating required for removal of the solvent by distillation when the reaction has been completed. It has now been discovered that hydrogenation of compounds of this type may be carried out successfully without the use of a solvent and with greater efficiency and lower costs due to such omission of solvent, by conducting the reaction under such conditions that the amine is melted and fluid.

The following examples of the practice of the invention are representative.

*Example 1.*—Two hundred fifty grams of freshly distilled phenyl alpha naphthylamine were placed in an autoclave with 15 grams of metallic nickel catalyst prepared according to the method of Raney (U. S. Patent 1,628,190) under an initial hydrogen pressure of 1800 pounds per square inch. The temperature was raised to 120° C. At this temperature the material was in a fluid condition. Agitation was now started and absorption of hydrogen began and proceeded to sensible completion in 95 minutes, the temperature being gradually raised meanwhile to 155° C.

In a duplicate run, the reaction was complete in 94 minutes at 102–152° C. Another run was complete in 78 minutes at 107–160° C.

The combined products from these runs were filtered to remove the catalyst, the catalyst was washed with ether, and the total filtrate was distilled, the following fractions being obtained:

| | Grams |
|---|---|
| 1. Up to 75° C./cc mm | |
| 2. 75° C./22 mm. to 130° C./2 mm | 86 |
| 3. 130–172° C./2 mm | 604 |
| 4. Above 172° C./2 mm | 12 |

Fraction 1 was the wash ether; fraction 2 was aniline and tetrahydronaphthalene; fraction 3 was phenyl tetrahydro alpha naphthylamine (the desired product), and fraction 4 was the high boiling residue.

*Example 2.*—Two hundred fifty grams phenyl β-naphthylamine and 10 grams metallic nickel catalyst were heated to 122° C. under a hydrogen pressure of 1770 pounds per square inch. Shaking was then commenced and hydrogen was absorbed. After a total time of 72 minutes at 122–153° C. the absorption was sensibly complete.

Another hydrogenation duplicating the above method was complete in 62 minutes at 144–159° C. while still another, employing 234 grams phenyl beta naphthylamine, was complete in 80 minutes at 120–155° C.

The united product of these three hydrogenations was filtered to remove catalyst and distilled in vacuo, the following fractions being taken:

| | Grams |
|---|---|
| 1. Up to 75°/24 mm | |
| 2. 70°/25 mm. to 150°/2 mm | 39 |
| 3. 150°/2 mm. to 175°/2 mm. (mainly 170–172°) | 650 |
| 4. Above 175°/2 mm | 5 |

Fraction 1 was the wash ether; fraction 2 was aniline and tetrahydronaphthalene; fraction 3 was phenyl tetrahydro beta naphthylamine (the desired product); and fraction 4 was the high boiling residue.

*Example 3.*—Two hundred fifty grams p-tolyl-beta-naphthylamine and 10 grams metallic nickel catalyst were heated to 120° C. under about 100 atmospheres hydrogen pressure. When the mixture was agitated hydrogen was absorbed, the reaction being complete in five hours at 120–200°. The high temperature required here to effect hydrogenation was due to the presence of traces of iodine (which is a poison for the catalyst) in the tolyl naphthylamine. Distillation of the filtered hydrogenation product gave 84.3% yield of a brown oily liquid which on standing gave crystals (M. P. 65–66°) of p-tolyl-ar-tetrahydro-beta-naphthylamine.

*Example 4.*—A charge of 40 pounds of phenyl-beta-naphthylamine, 1 pound of metallic nickel catalyst and four ounces of sifted calcium hydroxide was placed in an autoclave and heated to 125–140° to melt the amine. Hydrogen was introduced to a pressure of 800–1000 pounds per square inch and agitation was started. Hydrogen was absorbed at once, the temperature rising to 200° for a short time as a result of the vigorous reaction. After two hours and 40 minutes the absorption was sensibly complete, and the hot liquor was blown from the autoclave to a large hot filter to remove the catalyst.

*Example 5.*—In the following table are listed the more important data on the hydrogenation of four large batches of phenyl-beta-naphthylamine:

| No. | Amount | Catalyst | Lime | Pressure | Max. temp. | Time |
|---|---|---|---|---|---|---|
|  | *Pounds* |  | *Pounds* |  |  |  |
| 1 | 40.5 | 1.5 lbs | 0.25 | 100–1100 | 200 | 2 hr. 40 min. |
| 2 | 45 | From #1 |  | 300–1500 | 183 | 4 hr. |
| 3 | 39 | 1.0 lbs | 0.25 | 100–1370 | 200 | 1 hr. 55 min. |
| 4 | 40.7 | From #3 |  | 200–1200 | 200 | 2 hr. |

The crude hydrogenation product from #1 and #2 was distilled at 27.5 inches vacuum until the vapors reached 225° C. This distillation was to insure the removal of aniline and tetrahydro naphthalene. The residue in the still was stirred vigorously for one hour with 200 pounds hot water, 40 pounds muriatic acid and 4 ounces glue. The glue was added to assist in emulsifying the oil to facilitate extraction of the activating portion by hydrochloric acid. The aqueous layer was removed, and the black oily product was washed several times with hot water. Next the product was warmed in vacuo to expel water, and it was finally filtered. The product solidified on cooling to a brittle mass containing 85–90% phenyl-ar-tetrahydro-beta-naphthylamine.

The foregoing examples demonstrate the ease and efficiency with which the invention may be practiced. It is to be understood, however, that the examples are not limitative but merely illustrative. Any other aryl naphthylamine may be treated in similar manner. Other representative compounds which may be hydrogenated by this method are para tolyl alpha naphthylamine, xylyl alpha- and beta- naphthylamines, di-alpha-naphthylamine, di-beta-naphthylamine, p-methoxy phenyl-alpha-naphthylamine, etc. Also included are the diaryl naphthylamines including diphenyl naphthylamines, ditolyl naphthylamines, dixylyl naphthylamines, phenyl tolyl naphthylamines, etc.

Representative products obtained are para tolyl alpha tetrahydronaphthylamine, xylyl alpha and beta tetrahydronaphthylamine, di-alpha-tetrahydronaphthylamine, di-beta-tetrahydronaphthylamine, p-methoxy phenyl-alpha-tetrahydronaphthylamine, the diphenyl tetrahydronaphthylylamines, the ditolyl tetrahydronaphthylamines, the dixylyl tetrahydronaphthylamines, the phenyl tolyl tetrahydronaphthylamines, etc.

It is also to be understood that the practice of the invention is not limited to the temperatures and pressures of the examples. The temperature must be sufficient to melt the naphthylamine being hydrogenated and the material should preferably be completely liquefied before agitation is started. Temperatures below 160° C. are desirable to minimize hydrogenation beyond the tetrahydro point. However, impurities tending to poison the catalyst, or other considerations may render higher temperatures necessary. Operating temperatures will usually lie between 90° C. and 200° C. and the preferred range is 90–160° C.

The hydrogen pressure will ordinarily be at least 300 pounds per square inch. As this pressure is increased the reaction proceeds faster. Therefore, it is desirable to hydrogenate at the highest practical pressure.

Other nickel catalysts than that prepared by the Raney method may be employed in the invention. Also other metals such as cobalt, copper, iron, platinum, etc. may be substituted for nickel or several metals may be used in combination. In fact, more or less workable results are obtainable with any metal hydrogenation catalyst in which the metal is present in metallic form. However, the base metal catalysts, and particularly nickel, are preferred.

It is, of course, desirable that the starting materials be substantially free from catalyst poisons in order that the reaction may be conducted in a short time and at lower temperatures. The preliminary processing necessary will vary with individual cases.

The hydrogenation practiced according to the invention yields a mixture of the ar- and ac-varieties of the tetrahydronaphthylamines in which the aromatic type tends to predominate. For instance, in Example 1, the product consisted of about 88% phenyl-ar-tetrahydro-alpha-naphthylamine and 12% of the ac-compound. In Example 2, the product was about 92% phenyl-ar-tetrahydro-beta-naphthylamine and 8% of the ac-variety. The alicyclic compounds may be extracted from the mixture, leaving the aromatic compounds, by washing with dilute hydrochloric acid, as illustrated in Example 5.

In view of the foregoing, although only the preferred forms of the invention have been described in detail, it will be apparent to those skilled in the art that various modifications may be made therein without departing from the spirit of the invention or the scope of the appended claims, in which it is intended that the patent shall cover by suitable expression in such claims, all features of patentable novelty residing in the invention.

I claim:

1. The method of treating aryl naphthylamines which comprises hydrogenating the same under a hydrogen pressure of at least 300 pounds per square inch and in the presence of a metallic hydrogenation catalyst and in the absence of a solvent and at such a temperature that the reacting material is in a fluid state.

2. The method of treating phenyl beta naphthylamine which comprises hydrogenating the same under a hydrogen pressure of at least 300 pounds per square inch and in the presence of metallic nickel and in the absence of a solvent and at such a temperature that the reacting material is in a fluid state.

3. The method of treating phenyl alpha naphthylamine which comprises hydrogenating the same under a hydrogen pressure of at least 300 pounds per square inch and in the presence of metallic nickel and in the absence of a solvent and at such a temperature that the reacting material is in a fluid state.

4. The method of treating para tolyl beta naphthylamine which comprises hydrogenating the same under a hydrogen pressure of at least 300 pounds per square inch and in the presence of metallic nickel and in the absence of a solvent and at such a temperature that the reacting material is in a fluid state.

5. The method of treating aryl naphthylamines which comprises hydrogenating the same under a hydrogen pressure of at least 300 pounds per square inch and in the presence of a base metal hydrogenation catalyst and in the absence of a solvent and at such a temperature that the reacting material is in a fluid state.

6. The method of treating secondary aryl naphthylamines which comprises hydrogenating the same under a hydrogen pressure of at least 300 pounds per square inch and in the presence of a metallic hydrogenation catalyst and in the absence of a solvent and at such a temperature that the reacting material is in a fluid state.

7. The method of treating aryl naphthylamines which comprises hydrogenating the same under a hydrogen pressure of at least 300 pounds per square inch and in the presence of a metallic hydrogenation catalyst and in the absence of a solvent and at a temperature of 90–200° C.

8. The method of treating aryl naphthylamines which comprises hydrogenating the same under a hydrogen pressure of at least 300 pounds per square inch and in the presence of a metallic hydrogenation catalyst and in the absence of a solvent and at a temperature of 90–160°.

9. The method of treating secondary aryl naphthylamines which comprises hydrogenating the same under a hydrogen pressure of at least 300 pounds per square inch and in the presence of a base metal hydrogenation catalyst and in the absence of a solvent and at such a temperature that the reacting material is in a fluid state.

10. The method of treating secondary aryl naphthylamines which comprises hydrogenating the same under a hydrogen pressure of at least 300 pounds per square inch and in the presence of metallic nickel and in the absence of a solvent and at such a temperature that the reacting material is in a fluid state.

11. In the hydrogenation of an aryl naphthylamine comprising subjecting the aryl naphthylamine to a hydrogen pressure of at least 300 pounds per square inch in the presence of a hydrogenation catalyst, the improvement which consists in conducting the reaction in the absence of a solvent and at such a temperature that the reacting material is in a fluid state.

CHARLES F. WINANS.

CERTIFICATE OF CORRECTION.

Patent No. 2,095,897. October 12, 1937.

CHARLES F. WINANS.

It is hereby certified that error appears in the printed specification of the above numbered patent requiring correction as follows: Page 1, first column, line 50, in the table, for "cc" read 22; and that the said Letters Patent should be read with this correction therein that the same may conform to the record of the case in the Patent Office.

Signed and sealed this 25th day of January, A. D. 1938.

(Seal)

Henry Van Arsdale,
Acting Commissioner of Patents.